April 5, 1960  A. E. TILLEY  2,931,972
APPARATUS FOR RESISTIVITY SURVEYING OF THE EARTH
Filed July 24, 1956
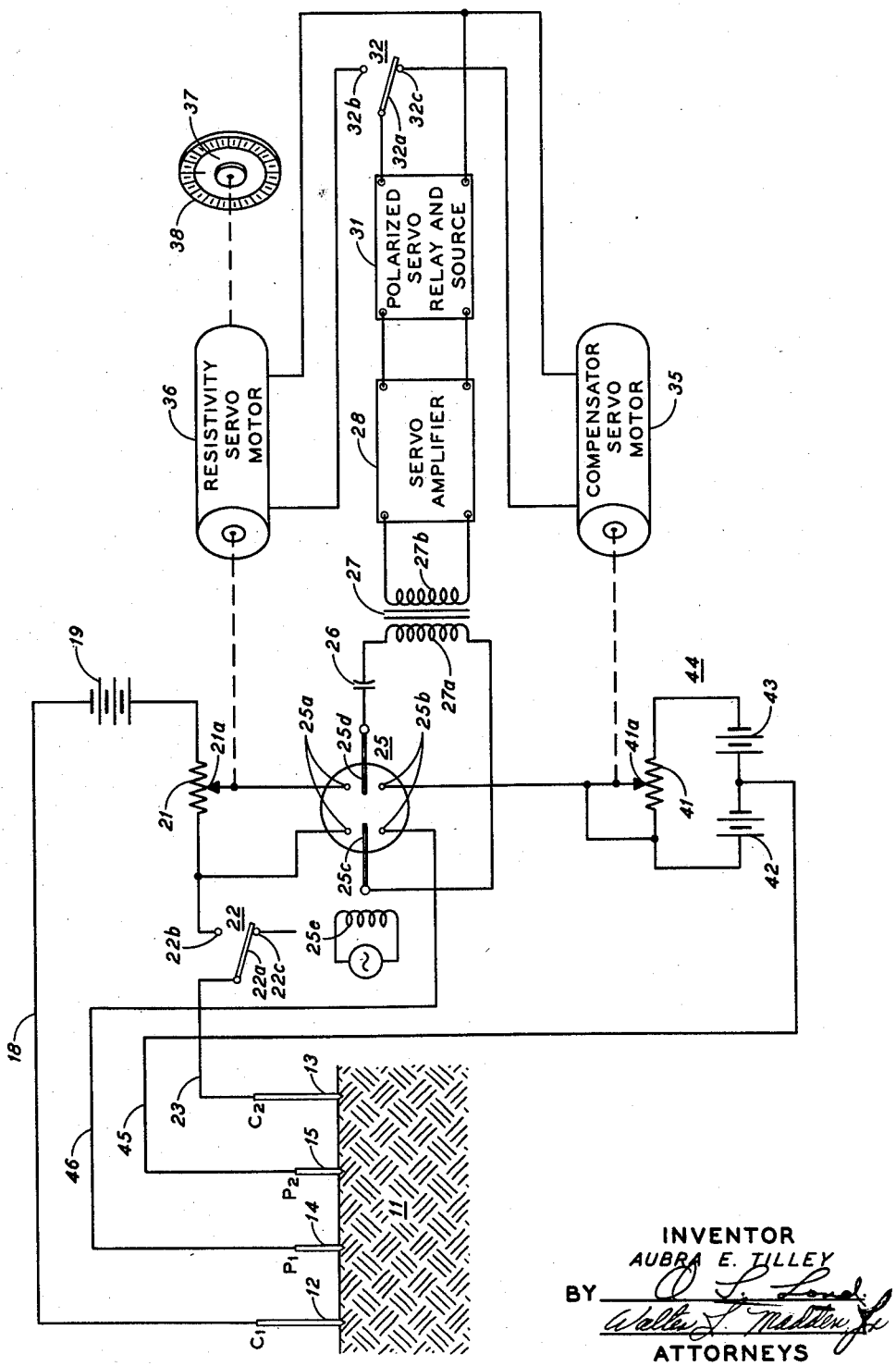
INVENTOR
AUBRA E. TILLEY
BY
ATTORNEYS

United States Patent Office 2,931,972
Patented Apr. 5, 1960

2,931,972

APPARATUS FOR RESISTIVITY SURVEYING OF THE EARTH

Aubra E. Tilley, Fullerton, Calif., assignor to California Research Corporation, San Francisco, Calif., a corporation of Delaware Application July 24, 1956, Serial No. 599,810

1 Claim. (Cl. 324—1)

This invention relates in general to resistivity surveying of the earth's surface and relates more particularly to improved methods and apparatus for carrying out such surveying.

It is well known that valuable information on the nature of the subsurface strata in a given area can be obtained by means of electrical resistivity surveys made on the surface of the ground in and around this area. In such surveying, electrical energy is applied to the earth through two or more current electrodes, and the resulting potential difference produced across two or more potential electrodes is measured. From a knowledge of the electrode configuration and the relationship of this potential difference to the intensity of current supplied to the current electrodes, the earth's resistivity in the surveyed area may be determined, and from this resistivity facts as to the nature of the subsurface strata may be deduced.

Numerous problems are encountered in such resistivity surveying, and one of the most troublesome of such problems is the presence of the natural or self-potential of the earth which introduces an undesired voltage in the potential measuring circuit. In many resistivity surveying methods it is necessary to manually compensate or cancel this self-potential before taking readings of the parameters involved. Such compensation is usually accomplished by manually introducing a compensating voltage into the electrode circuit and repeating the measurement several times to assure reliable data. The individual readings are then averaged to obtain a value used for computation. Such a procedure is obviously undesirable from the standpoint of efficiency of operation of the resistivity surveying crew, as well as from the standpoint of the accuracy of the results obtained from this averaging procedure. Even where semi-automatic or automatic equipment has been proposed for this self-potential compensating problem, such equipment has not been completely satisfactory.

An additional problem in connection with resistivity surveying is the computation of the resistivity values from the observed potential and current values taken during the survey. The resistivity is a function of the electrode configuration and these current and potential values, and the computation of the resistivity is often laborious and time-consuming. Even when semiautomatic or automatic equipment is utilized in the surveying equipment to produce a measured value expressing some relation to the resistivity, such equipment has not been completely satisfactory.

Broadly the present invention contemplates improved methods and apparatus for resistivity surveying of the earth in which automatic compensation is provided for the earth's self-potential appearing across the potential electrodes. This compensation is accomplished by impressing a measure of the earth's natural potential which exists between the potential electrodes across the sensing element of a servo mechanism. The servo mechanism is actuated in response to the magnitude and polarity of this potential to introduce into the potential electrode circuit a compensating voltage equal in magnitude and opposite in polarity to the natural potential so that the net potential in the potential electrode circuit is zero.

The present invention further contemplates improved methods and apparatus for producing an indication of a characteristic of the resistivity under measure by comparing the potential across the potential electrodes with a potential which is a measure of the current flowing in the current electrode circuit. A servo mechanism is actuated in response to the result of this comparison to drive a potentiometer for varying the impedance in the current electrode circuit until the two compared potentials are equal. A suitable indicator is mechanically connected to this latter servo mechanism, and since the position of the resistivity potentiometer is directly proportional to the potential across the potential electrodes, and inversely proportional to the current flowing through the current electrodes, the position of the indicator is a measure of a characteristic of the resistivity under measure.

The automatic compensation for self-potential is, of course, performed prior to energizing the current electrodes, and after energization of the current electrodes the automatic resistivity measuring may be performed. Thus a single servo sensing element may be utilized for both the compensation and measuring stages, and its output selectively supplied to either the compensating servo mechanism or the resistivity measuring servo mechanism.

Objects and advantages of the present invention will be further apparent from the following description when read in connection with the accompanying drawing, in which the single figure diagrammatically and schematically illustrates one embodiment of the present invention in connection with a representative resistivity surveying operation.

Referring to the drawing by character of reference, numeral 11 designates generally an area of the earth to be investigated by resistivity surveying. Such surveying may be accomplished by any suitable known arrangement or configuration of the electrodes, and in the drawing the so-called Wenner configuration is shown, wherein a pair of current electrodes 12 and 13 are inserted in the earth at spaced points. A pair of potential electrodes 14 and 15 are inserted in the earth between current electrodes 12 and 13, and preferably the four electrodes are arrayed in a straight line, in the Wenner configuration, the spacings between adjacent electrodes being equal.

Current electrode 12 is connected through an electrical conductor 18 to one terminal of a power source represented by battery 19. The other terminal of the battery 19 is connected to one terminal of a resistivity measuring potentiometer 21 having an adjustable tap 21a. The other terminal of potentiometer 21 is connected to one terminal 22b of a selector switch 22 having another terminal 22c and a switch arm 22a. Switch arm 22a is connected to current electrode 13 through a conductor 23. When switch arm 22a engages contact 22b, current flows from battery 19 to current electrode 12, through the earth to current electrode 13, through switch 22 and resistivity potentiometer 21 back to battery 19. When switch arm 22a engages 22c no current flows between electrodes 12 and 13, since contact 22 is electrically dead.

Adjustable tap 21a of resistivity potentiometer 21 is connected to one of a first pair of fixed contacts 25a of a multivibrator device 25. Vibrator 25 also has another pair of fixed contacts 25b and a pair of vibrating contacts 25c and 25d. Vibrating contacts 25c and 25d are excited at a suitable frequency by an excitation coil 25e and operate in synchronism to alternately engaged contacts 25a and 25b. Vibrating contacts 25c and 25d are connected through a capacitor 26 to the primary winding 27a of a transformer 27 having a secondary winding 27b.

The output from secondary winding 27b is supplied to the input of a servo amplifier 28 whose output is in turn supplied to a polarized servo relay and motor voltage source 31. Servo amplifier 28 and excitation coil 25e are preferably operated from the same source to insure proper phasing of these quantities.

The output of polarized servo relay and source 31 is selectively applied through a selector switch 32 to either a compensator servo motor 35 or a resistivity measuring servo motor 36. Switch 32 has a contact arm 32a which is selectively engageable with either a contact 32b connected to resistivity servo motor 36 or a contact 32c connected to compensator servo motor 35. Switch 32 is preferably ganged or mechanically connected to switch 22 to insure operation of these two switches in unison. Vibrator 25, transformer 27, servo amplifier 28 and polarized relay and motor source 31 comprise a servo sensing element for controlling the direction of rotation of servo mechanisms 35 and 36.

Resistivity servo motor 36 is mechanically connected, as shown by the dotted line, to the adjustable tap 21a of resistivity potentiometer 21 and operates to mechanically move this tap in a direction and to a degree determined respectively by the polarity and magnitude of the output voltage from servo amplifier 28. Resistivity servo motor 36 also has mechanically connected thereto and driven thereby an indicating device comprising, in the illustrated embodiment, an index 37 movable about a calibrated dial 38.

Compensator servo motor 35 is mechanically connected, as shown by the dotted line, to the adjustable tap 41a of a compensating potentiometer 41. Potentiometer 41 has connected thereacross a pair of batteries 42 and 43 and the junction of these batteries is connected through a conductor 45 to potential electrode 15. Potentiometer 41 and batteries 42 and 43 thus form a bridge circuit 44 whose value can be changed by movement of adjustable tap 41a to effectively vary the voltage across the outer terminals of this bridge circuit. Adjustable tap 41a is electrically connected to one of the fixed contacts 25b and the other fixed contact 25b is connected through a conductor 46 to potential electrode 14. Potential electrodes 14 and 15 are thus connected through the bridge circuit formed by potentiometer 41 and batteries 42 and 43 to fixed contacts 25b for impressing across contacts 25b a measure of the potential appearing across potential electrodes 14 and 15.

The operation of the illustrated embodiment is as follows. As is well known in the art, the surveying may be conducted on any suitable basis, such as resistivity profiling, in which the electrode configuration is moved from setup to setup, usually in a straight line, to obtain an indication of the resistivity of the earth to approximately a constant depth. Alternatively, resistivity sounding may be utilized, in which the center of the spread is maintained at a fixed reference point and the electrodes are progressively moved out, usually in a straight line, while maintaining equal spacing between adjacent electrodes.

After insertion of the current and potential electrodes in the earth, switches 22 and 32 are moved to the compensating position to close contacts 22c and 32c respectively. No current flows between current electrodes 12 and 13 from battery 19 during this compensating operation, since switch contact 22c is electrically dead and thus disconnects electrodes 12 and 13 from the battery. Potential electrodes 14 and 15 are connected across contacts 25b of vibrator 25 through bridge circuit 44 formed by potentiometer 41 and batteries 42 and 43. Assuming adjustable tap 41a to be in the midpoint of potentiometer 41, the voltages of batteries 42 and 43 effectively cancel so that this bridge circuit does not introduce any voltage in the circuit.

Potential electrodes 14 and 15 are thus effectively connected to contacts 25b, and assuming that some self-potential of the earth exists between potential electrodes 14 and 15, this potential will be impressed across contacts 25b and will be sampled by vibrating contacts 25c and 25d when these vibrating contacts engage contacts 25b. This measure of the earth's self-potential between electrodes 14 and 15 is thus supplied through contacts 25c, 25d and capacitor 26 to primary winding 27a of transformer 27 to produce across primary winding 27b a voltage having a polarity and magnitude determined by the polarity and magnitude of the self-potential. This self-potential voltage is amplified in servo amplifier 28 and supplied to servo relay 31 which produces an output of a predetermined polarity.

Since switch 32 is closed on contact 32c, this polarized output from device 31 is supplied to compensator servo motor 35 to drive this motor in predetermined direction. Compensator motor 35 thus drives tap 41a along potentiometer 41 until the voltage generated in bridge 44 is equal to the self-potential between electrodes 14 and 15. When the compensating voltage from bridge 44 equals the self-potential, the voltage across contacts 25b decreases to zero to thus eliminate the output signal supplied to the servo sensing mechanism and thus stop the operation of compensator servo motor 35.

The potential electrode circuit has now been compensated for the earth's self-potential and the resistivity measuring may commence. Switches 22 and 32 are moved, preferably in unison, to engage contacts 22b and 32b respectively. Closure of contact 22b connects battery 19 to the current electrodes 12 and 13 through resistivity potentiometer 21 and current flows between the electrodes through the earth. This flow of current produces a potential drop between electrodes 14 and 15 and this potential drop is impressed across contacts 25b through bridge 44. Contacts 25a of vibrator 25 have impressed thereacross from resistivity potentiometer 21 a measure of the current flow between current electrodes 12 and 13.

Vibrating contacts 25c and 25d alternately engage contacts 25a and 25b to alternately sample the potentials across these contacts and to impress on primary winding 27a through capacitor 26 a measure of the difference in magnitude and polarity of the two sampled potentials. Assuming that the potentials across contacts 25a is different from the potential across contacts 25b, vibrating contacts 25c and 25d will supply to transformer 27 an error signal of a polarity and a magnitude dependent upon the direction and magnitude of the potential difference. This error signal is amplified in servo amplifier 28 and actuates polarized relay 31 to energize resistivity servo motor 36 with a voltage of a polarity determined by the polarity of the imbalance. Resistivity servo motor 36 operates to drive adjustable tap 21a in a direction to adjust the potential across the adjustable portion of potentiometer 21 so that the potential across contacts 25a equals the potential across contacts 25b. When these potentials are equalized the error signal supplied to transformer 27 decreases to zero to de-energize polarized servo relay 31 and deenergize resistivity servo motor 36.

Resistivity servo motor 36, in addition to driving adjustable tap 21a, also mechanically drives index 37 of the indicator device. Since the position of the adjustable tap 21a of resistivity potentiometer 21 is directly proportional to the potential between electrodes 14 and 15 and is inversely proportional to the current flowing through current electrodes 12 and 13, the position of this adjustable tap is a measure of a characteristic of the resistivity under measure. Since index 37 is effective mechanically connected to adjustable tap 21a, the position of this index relative to dial 38 is also a measure of this characteristic. Dial 38 can be calibrated directly in terms of resistivity, but since, in such a case, the varied electrode configurations used in the field would require a specific calibration for each electrode arrangement, dial 38 is preferably calibrated in terms of the ratio of the potential between potential electrodes 14 and 15 to the current between electrodes 12 and 13. This ratio, when multiplied by a factor determined by the electrode arrangement, will give a product equal to the resistivity under measurement.

Although but a few embodiments of the present invention have been described, it will be apparent to those skilled in the art that various changes and modifications may be made therein without departing from the spirit of the invention or the scope of the appended claim.

I claim:

Apparatus for use in resistivity surveying of the earth wherein electrical energy is supplied to a pair of spaced current electrodes inserted in the earth and the resulting potential is measured between a pair of spaced potential electrodes inserted in the earth between said current electrodes comprising a multivibrator device having a first pair of fixed contacts and a second pair of fixed contacts, a pair of complementary vibrating contacts adapted to make alternate electrical contact with said first pair and second pair of fixed contacts, means to vibrate said vibrating contacts in synchronism, an electrical conductor connecting one of the contacts of said first pair of fixed contacts with a first potential electrode inserted in the earth, a first electrical circuit connecting the other contact of said first pair of fixed contacts with a second potential electrode inserted in the earth, said first circuit comprising a balancing bridge circuit including a first adjustable resistor and a source of electrical potential, a first servo motor means operably connected to said first adjustable resistor to adjust the resistance thereof automatically to produce a potential between said first pair of fixed contacts equal and opposite to the self-potential of the earth between said potential electrodes, electrical conductors connecting said pair of vibrating contacts through a capacitor with respective ends of the primary winding of a transformer, a servo amplifier electrically connected to the secondary winding of said transformer, a polarized servo relay connected to said amplifier for operation thereby, a motor voltage source connected to said servo amplifier and said servo relay, a selector switch connected in the electrical output circuit of said servo relay to selectively apply motor power through said servo relay to said first servo motor means and to a second servo motor means, an electrical conductor connecting one of the contacts of said second pair of fixed contacts in said multivibrator device through a connecting and disconnecting switch with a first current electrode inserted in the earth, a second electrical circuit connecting the other contact of said second pair of fixed contacts with a second current electrode inserted in the earth, said second circuit comprising a second adjustable resistor and a source of current connected in series between said other contact of said second pair of fixed contacts and said second current electrode, said second servo motor means operably connected to said second adjustable resistor to adjust the resistance thereof automatically to produce a potential between said second pair of fixed contacts equal to the potential between said first pair of fixed contacts, and an indicating means operably connected to said second servo motor means for indicating a characteristic of the relationship between the potential across said potential electrodes and the current flowing between said current electrodes.

References Cited in the file of this patent

UNITED STATES PATENTS

| | | |
|---|---|---|
| 2,288,310 | Zuschlag | June 30, 1942 |
| 2,343,140 | Evjen | Feb. 29, 1944 |
| 2,752,561 | Gillies | June 26, 1956 |